May 14, 1935.　　　　J. N. BANE　　　　2,001,650

BOOKMARK

Filed Sept. 19, 1933

John N. Bane, INVENTOR

BY Victor J. Evans & Co.

ATTORNEY

UNITED STATES PATENT OFFICE 2,001,650

BOOKMARK

John N. Bane, South Boston, Va.

Application September 19, 1933, Serial No. 690,158

1 Claim. (Cl. 116—119)

This invention relates to book marks and has for the primary object the provision of a device of the above stated character which will be simple, durable and convenient to place in a book for marking a place therein and also may be easily carried within a person's pocket or pocketbook and may be readily adjusted to indicate the numbers of a particular page of a book or to be used as a reminder of a given time, which may be the departure of a bus, train or the like and also may be employed for any other purposes.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating a book with a marker applied thereto and constructed in accordance with my invention.

Figure 1:
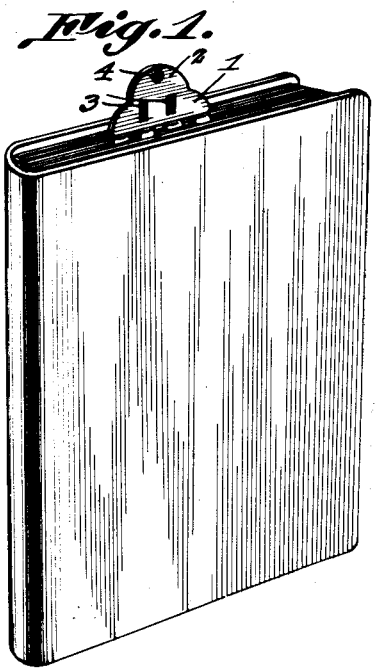
Figure 5:
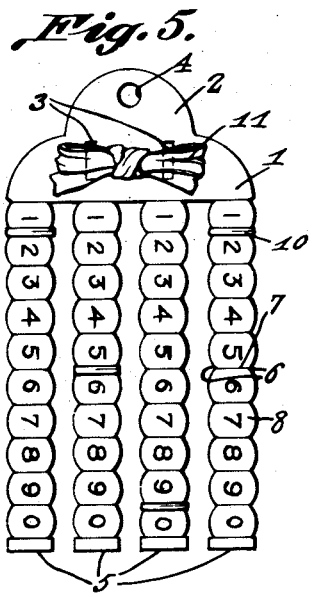
Figure 5 is a plan view illustrating a slight modification of my invention.
Figure 2:
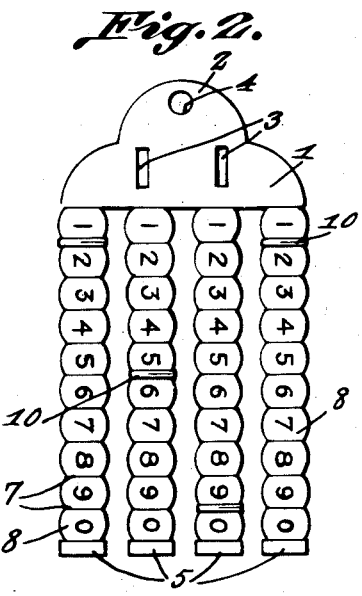
Figure 2 is a plan view illustrating one side of the marker.
Figure 3:
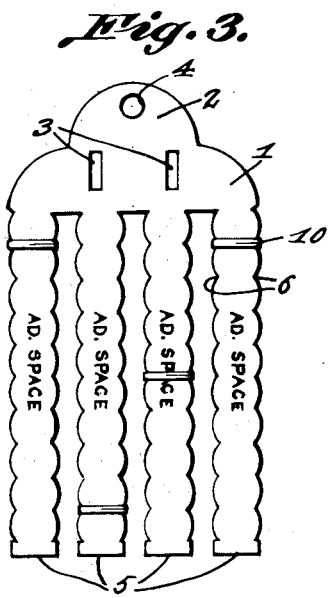
Figure 3 is a similar view illustrating the other side of the marker.
Figure 4:
Figure 4 is an end view illustrating the marker.

Referring in detail to the drawing, the numeral 1 indicates a head portion shaped to provide a finger portion 2 and said portions are provided with slots 3 and an opening 4. Formed integrally are relatively spaced and parallel fingers 5 and each finger is provided with pairs of oppositely arranged notches 6. Each finger between the pairs of notches is provided with a line 7 dividing each member into a series of spaces 8. The spaces of each finger are numbered from zero to nine. An elastic member 10 is mounted on each of the fingers 5 and by positioning said members in the various notches the fingers will indicate a desired combination of numbers when said numbers are read together for the purpose of indicating the number of a page of a book or time of a business appointment or the departure of a train, bus or the like. The marker may be readily placed between the leaves of a book, as shown in Figure 1, or may be carried within a person's pocket or pocketbook.

The face of the marker opposite to the face having the characters thereon may have printed or otherwise applied thereto desired advertisements. An ornamental strip 11 may be passed through the slots of the body 1 and tied in a knot for the purpose of giving the device an artistic appearance.

While I have shown and described the preferred embodiment of my invention, it will be understood that minor changes in construction, combination and arrangement of parts may be made without departing from the spirit and scope of my invention, as claimed.

Having described the invention, I claim:

A marker comprising a body shaped to form a finger grip at one edge thereof, relatively spaced and parallel fingers formed integrally with the edge of the body opposite to the edge having the finger grip and each divided into a series of spaces and the spaces of each finger bearing a different character, said fingers having pairs of oppositely arranged notches with the notches of each pair arranged at opposite edges of the fingers, and endless elastic elements surrounding the fingers and each movable from one pair of notches to another pair of notches.

JOHN N. BANE.